(12) United States Patent
Wallace

(10) Patent No.: US 8,002,641 B2
(45) Date of Patent: Aug. 23, 2011

(54) METHOD OF MAKING DIRECT TENSION INDICATING WASHERS

(75) Inventor: Ivan Wayne Wallace, Walpole, NH (US)

(73) Assignee: Applied Bolting Technology Products, Inc., Bellows Falls, VT (US)

( * ) Notice: Subject to any disclaimer, the term of this patent is extended or adjusted under 35 U.S.C. 154(b) by 0 days.

(21) Appl. No.: 12/891,021

(22) Filed: Sep. 27, 2010

(65) Prior Publication Data

US 2011/0014986 A1    Jan. 20, 2011

Related U.S. Application Data

(62) Division of application No. 11/875,224, filed on Oct. 19, 2007, now abandoned.

(60) Provisional application No. 60/874,457, filed on Dec. 12, 2006.

(51) Int. Cl.
*B21D 53/20* (2006.01)

(52) U.S. Cl. ............................ 470/41; 470/47

(58) Field of Classification Search .................. 470/8, 9, 470/41, 42, 162, 163, 47; 411/10, 13; 427/202, 427/205, 495; 73/761, 762

See application file for complete search history.

(56) References Cited

U.S. PATENT DOCUMENTS

| | | | |
|---|---|---|---|
| 3,137,268 A | 6/1964 | Hornwood | |
| 3,187,621 A * | 6/1965 | Turner | 411/10 |
| 3,304,827 A | 2/1967 | Bush | |
| 3,948,141 A | 4/1976 | Shinjo | |
| 4,037,516 A | 7/1977 | Hart | |
| 4,428,982 A * | 1/1984 | Wallace | 427/202 |
| 5,769,581 A | 6/1998 | Wallace et al. | |
| 5,931,618 A | 8/1999 | Wallace et al. | |
| 6,030,701 A * | 2/2000 | Johnson et al. | 428/343 |
| 6,059,500 A | 5/2000 | Dirmeier et al. | |
| 6,425,718 B1 | 7/2002 | Herr et al. | |
| 6,609,865 B2 | 8/2003 | Daigneault | |
| 7,021,153 B2 * | 4/2006 | Almanstoetter et al. | 73/761 |
| 7,745,561 B2 * | 6/2010 | Bahr et al. | 528/272 |

* cited by examiner

*Primary Examiner* — Edward Tolan
(74) *Attorney, Agent, or Firm* — Cantor Colburn LLP

(57) ABSTRACT

A method of making a direct tension indicating washer including: forming a first surface having a discrete protuberance formed thereon; forming a second surface having a discrete indentation formed opposite the protuberance; and positioning an indicating material in the indentation, wherein the indicating material has a cured skin on an outside of the indicating material and a liquid core in an interior of the indicating material.

9 Claims, 9 Drawing Sheets

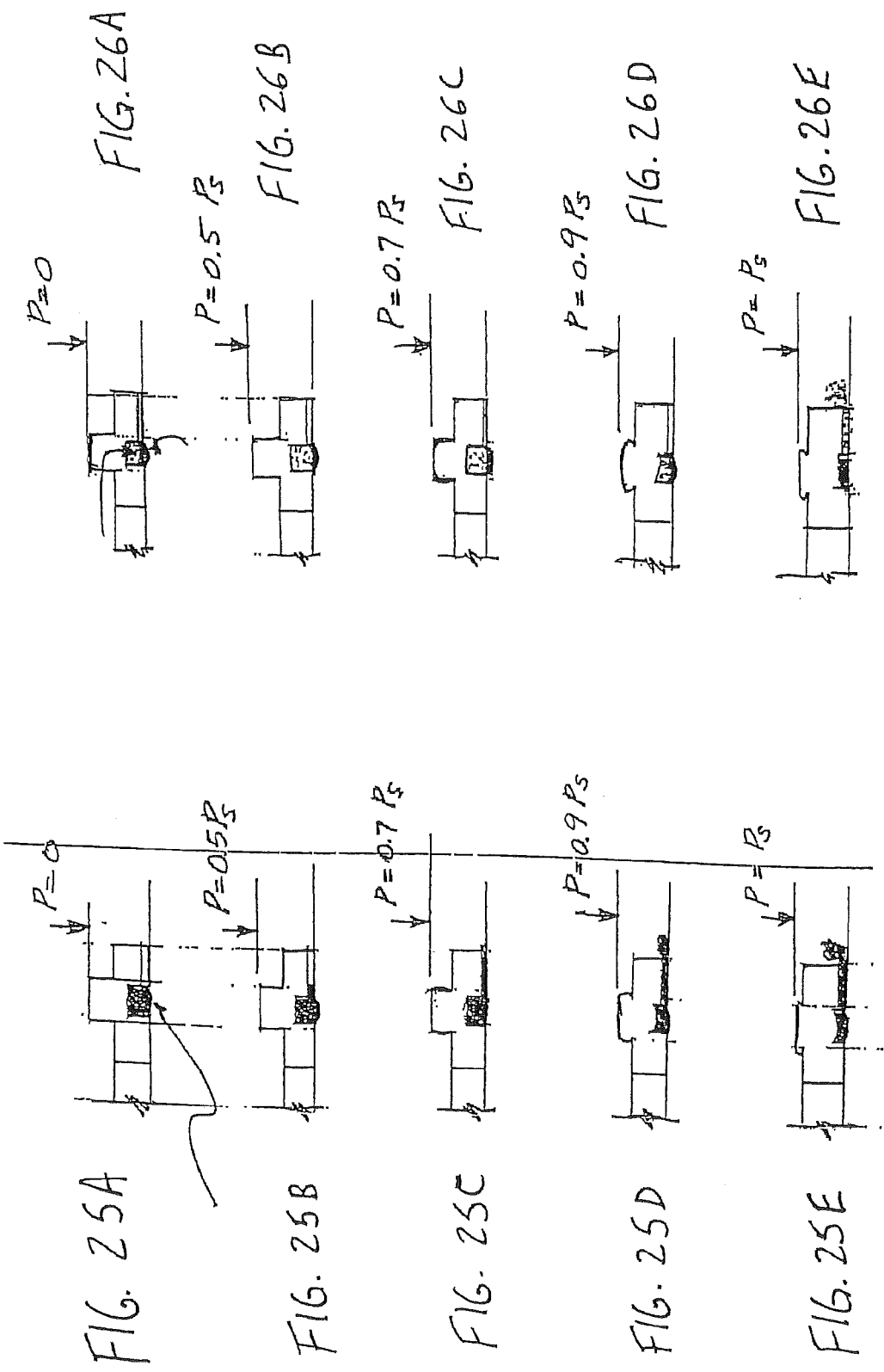

METHOD OF MAKING DIRECT TENSION INDICATING WASHERS

CROSS REFERENCE TO RELATED APPLICATIONS

This application is a divisional of U.S. patent application Ser. No. 11/875,224 filed Oct. 19, 2007, the entire contents of which are incorporated herein by reference, which claims the benefit of U.S. provisional patent application Ser. No. 60/874,457 filed Dec. 12, 2006, the entire contents of which are incorporated herein by reference.

BACKGROUND

The invention relates in general to direct tension indicating and maintaining washers and in particular to direct tension indicating and maintaining washers that maintain bolt tension and/or indicate when the proper bolt tension has been achieved.

High strength metal bolts, along with their corresponding nuts, when used in metal connections, are almost always intended to be installed so that they are tensioned. The tensioning is usually accomplished by turning the nut relative to the bolt a specified amount of rotation or until a certain torque resistance has been reached. The tension in the bolt stretches the bolt and compresses the connection plates between the bolt head and nut so the connection plates do not slip relative to each other. It is this slip resistance which holds structures such as bridges and buildings together.

FIG. 1 is a top view of a conventional direct tension indicating washer 10, commonly referred to as a DTI. The direct tension indicating washer 10 includes a series of protuberances 12 formed on a first surface 14. As shown in FIG. 2, corresponding indentations 16 are formed in a second surface 18 of the direct tension indicating washer 10. As shown in FIGS. 3 and 4, the direct tension indicating washer 10 is manufactured through a stamping operation in which the blank metal washer 10 is placed between a tool 20 and a die 22. Pressure is applied to the tool 20 (e.g. by a press) and a protrusion 24 on the tool 20 creates the protuberance 12, and the corresponding indentation 16, in the direct tension indicating washer 10 as shown in FIG. 4.

The DTI is manufactured so that when the tightening of the bolt forces the protrusions 12 to compress, or reduce height, sufficiently, the bolt is said to have sufficient tension to meet code requirements. Determination of sufficient protrusion compression is accomplished in the field by the attempt to insert a feeler gage of specified thickness (e.g. 0.015") into the residual gap between the underside of the bolt head and the first surface 14 of the DTI. FIG. 1A shows a feeler gage being placed on a first surface of a direct tension indicating to test bolt tension (the bolt is not shown for clarity). If the attempt to insert the feeler gage is unsuccessful, that is, the inspector cannot insert the feeler gage into the gap half way radially around the DTI circumference between the DTI protuberances, the residual DTI gap (the space between the first surface of the direct tension indicating washer and the bottom of the bolt head) is said to be, on average, of dimension less than the thickness of the feeler gage, and is therefore judged acceptable. Conventional direct tension indicating washers are manufactured so that surfaces 14 and 18 are parallel and perpendicular to the longitudinal axis of the bolt which they are made to fit on, that is when the bolt is inserted through the inner diameter.

Conventional direct tension indicating washers, though well suited for their intended purposes, have several drawbacks. First, the process of attempting to insert the feeler gage into the DTI gap is time consuming and must be done after the bolt installer has stopped the tightening process. Second, over time, bolt tension declines as the bolt/nut threads seat into the mating steel surfaces and as external loads shake the connections and try to pry the bolt/nut apart. This problem is especially prominent in connections that are subject to vibration such as bridges, structures subject to earthquakes, connections supporting moving cranes and other equipment, etc. As the bolt tension declines, so does the clamping force and the capacity to carry external loads by resistance to slip. The conventional direct tension indicating washer 10 is flat and has the disadvantage that, after bolt installation, the protrusions 12 are essentially flattened inelastically and will not spring back to their original positions if the bolt begins to loose tension.

SUMMARY

Embodiments of the invention include a method of making a direct tension indicating washer including: forming a first surface having a discrete protuberance formed thereon; forming a second surface having a discrete indentation formed opposite the protuberance; and positioning an indicating material in the indentation, wherein the indicating material has a cured skin on an outside of the indicating material and a liquid core in an interior of the indicating material.

BRIEF DESCRIPTION OF THE DRAWINGS

Referring now to the drawings wherein like elements are numbered alike in the several Figures:

FIGS. 25A-25E illustrate emission of indicating material with increased bolt tension; and FIGS. 26A-26E illustrate emission of indicating material with increased bolt tension in an alternate embodiment.

DETAILED DESCRIPTION

Figure 5:
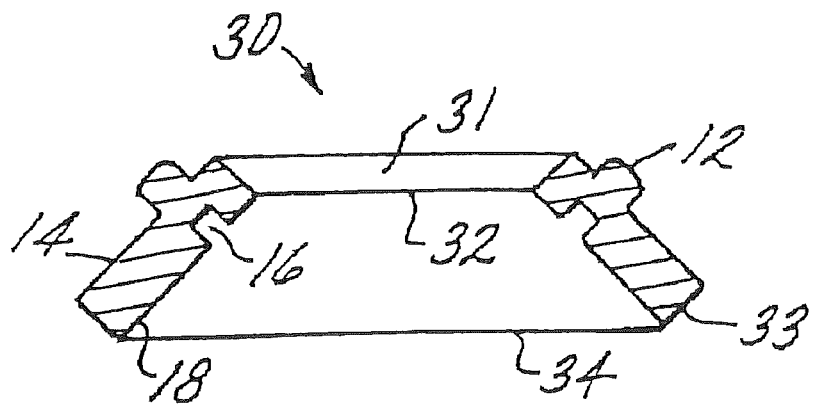
FIG. 5 is a cross-sectional view of a direct tension indicating and maintaining washer in accordance with a first embodiment of the invention.

FIG. 5 is a cross-sectional view of the direct tension indicating and maintaining washer of the present invention shown generally at 30. The direct tension indicating and maintaining washer is similar to the conventional washer shown in FIG. 1 in that a first surface 14 includes protuberances 12 and the second surface 18 includes indentations 16. The direct tension indicating and maintaining washer 30 has an opening formed therein having an inner diameter wall 31. The inner diameter wall 31 meets the second surface 18 at an inner diameter edge 32. The direct tension indicating and maintaining washer 30 has an outer diameter having an outer diameter wall 33. The outer diameter wall 33 meets the second surface 18 at outer diameter edge 34. The inner diameter edge 32 lies in a plane different from the plane of the outer diameter edge 34. In the exemplary embodiment shown in FIG. 5, the direct tension indicating and maintaining washer 30 has a conical cross section. It is understood that other geometries may be used.

Figure 3:
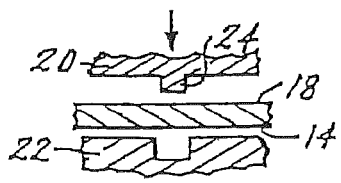
FIGS. 3 and 4 illustrate a process for creating the protuberances/indentations in the conventional direct tension indicating and maintaining washer.
Figure 4:
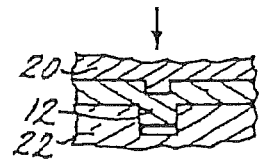
Figure 6:
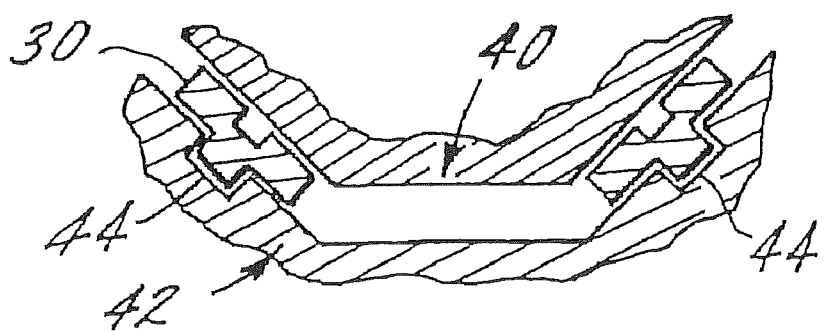
FIG. 6 illustrates a process for forming the direct tension indicating and maintaining washer shown in FIG. 5.

FIG. 6 illustrates a step in the process of making the direct tension indicating and maintaining washer 30. First, the protuberances 12 and indentations 16 are formed as described above with respect to FIGS. 3 and 4. Second, the direct tension indicating and maintaining washer 30 is placed between a second tool 40 and a second die 42. The second die includes recess 44 for receiving the protuberances 12 formed on the first surface of the direct tension indicating and maintaining washer 30. Pressure is applied to the tool 40 and the direct tension indicating and maintaining washer is formed into the conical shape shown in FIG. 5.

Although FIG. 6 illustrates a metal stamping manufacturing process, there are other processes, such as metal machining or metal casting, may be used to form the direct tension indicating and maintaining washer 30. In some cases, the metal product will be heat treated by quenching and tempering after forming to produce the required spring-like load/deformation properties. In an exemplary embodiment, the direct tension indicating and maintaining washer 30 is made from carbon steel, but stainless steel and other alloy products and non ferrous metals may also be used.

Figure 7:
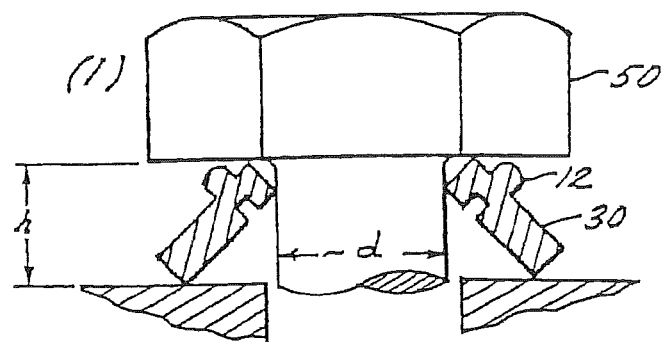
FIGS. 7-9 illustrate the state of the direct tension indicating and maintaining washer during the installation process.
Figure 8:
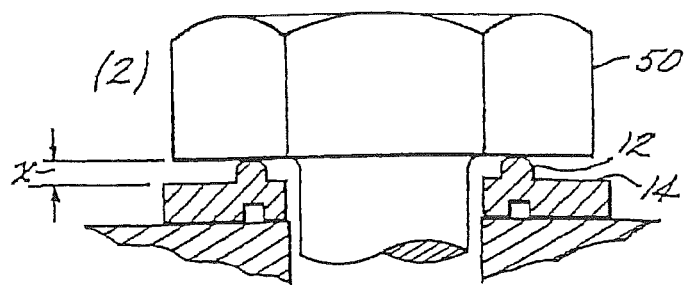
Figure 9:
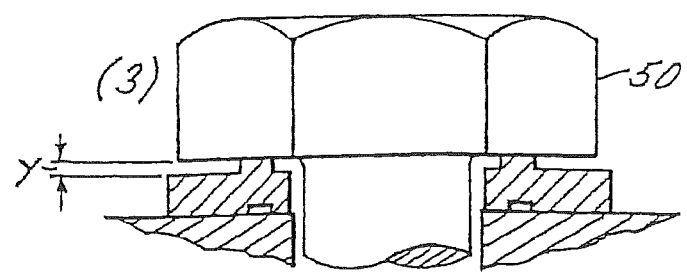

FIGS. 7-9 illustrate the state of the direct tension indicating and maintaining washer 30 during the installation process. FIG. 7 illustrates the placement of the direct tension indicating and maintaining washer 30 adjacent to a bolt head 50 which is threaded to a nut 52 (shown in FIG. 10). The conditions shown in FIG. 7 are identified as stage 1 where the bolt is at rest. As the bolt 50 is tightened by turning its nut 52, the direct tension indicating and maintaining washer 30 is flattened as shown in FIG. 8. At this state, identified as stage 2, the protuberances 12 on the first surface 14 of the direct tension indicating and maintaining washer 30 have not been fully compressed. The DTI gap, the distance between the first surface 14 and the bottom of the bolt head, is designated as x.

Although the direct tension indicating and maintaining washer 30 has been flattened so that the inner diameter edge and the outer diameter edge lie in the same plane, the direct tension indicating and maintaining washer 30 maintains its resiliency and will tend to return to its original conical shape when the bolt tension is released. As the bolt 50 is further tightened, the protuberances 12 are compressed and tightening is discontinued when the DTI gap is at or below a predetermined distance y. At this point, the bolt installer knows that the bolt tension is equal to or greater than the required minimum. This state is identified as stage 3 and is shown in FIG. 9. The tension may now be tested with a feeler gage as shown in FIG. 1A.

Figure 10:
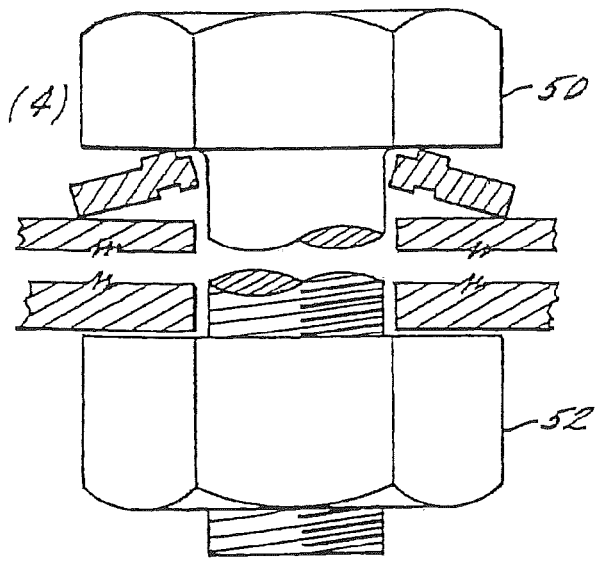
FIG. 10 illustrates the state of the direct tension indicating and maintaining washer after a decrease in bolt elongation.

FIG. 10 illustrates the state of the direct tension indicating and maintaining washer 30 as external loads, metal to metal deformation, or seating in of the bolt, vibration, temperature and other influences cause the bolt to tend to lose elongation. As shown in FIG. 10, the direct tension indicating and maintaining washer 30, due to its resilient nature, pushes against the bottom of the bolt 50 and maintains tension on the bolt. Accordingly, the direct tension indicating and maintaining washer 30 not only indicates when a predetermined bolt tension has been achieved upon bolt installation but maintains bolt tension even as the bolt tension would tend to decline during the life of the bolt/nut assembly.

Figure 1:
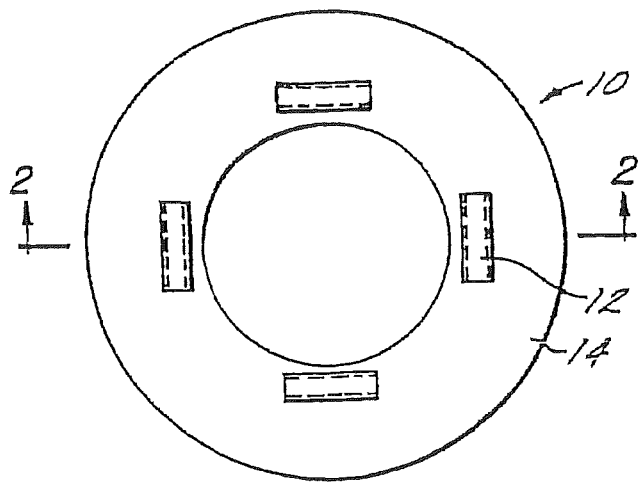
FIG. 1 is a top view of a conventional direct tension indicating and maintaining washer.
Figure 1A:
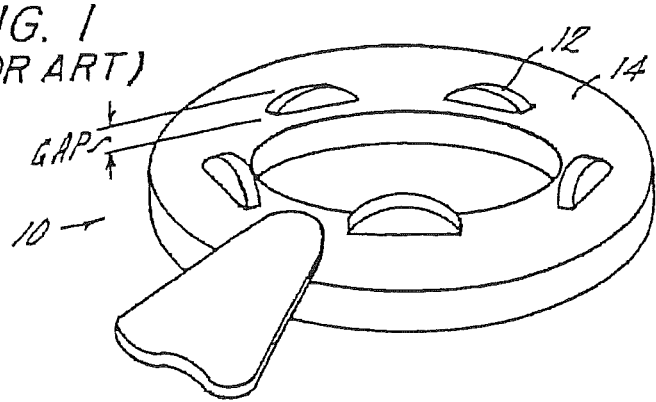
FIG. 1A is a perspective view of the use of a feeler gage to test bolt tension.
Figure 2:
FIG. 2 is a cross-sectional view of the direct tension indicating and maintaining washer shown in FIG. 1 taken along line 2-2.
Figure 11:
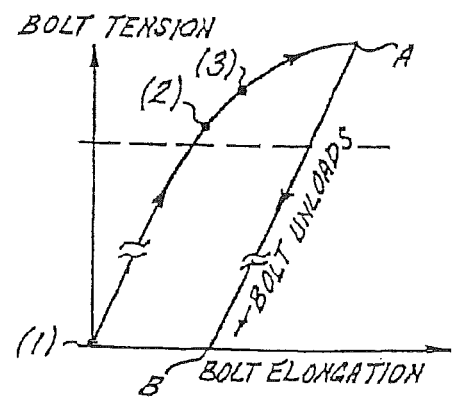
FIG. 11 is a graph of bolt tension versus bolt elongation when using the conventional direct tension indicating and maintaining washer shown in FIGS. 1-2.

FIG. 11 is a graph of bolt tension versus bolt elongation for a bolt/nut assembly using the conventional direct tension indicating washer 10 shown in FIG. 1. As the bolt is tightened, the bolt tension and the bolt elongation increase as shown in FIG. 11 until the bolt installer is satisfied that the proper tension is achieved at point A. Bolt elongation refers to the increase in bolt length due to tension on the bolt. As shown in FIG. 11, any reduction in the bolt elongation (due to vibration, temperature, etc.) will cause the bolt tension to tend to decline until ultimately, the bolt tension is zero or close to zero (point B).

Figure 12:
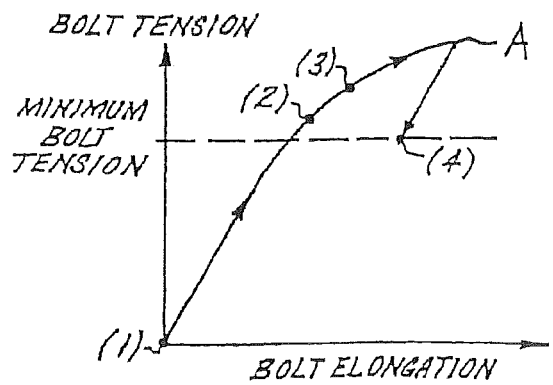
FIG. 12 is a graph of bolt tension versus bolt elongation when using the direct tension indicating and maintaining washer shown in FIG. 5.

FIG. 12 is a graph of bolt tension versus bolt elongation for a bolt/nut assembly using the direct tension indicating washer 30 shown in FIG. 5. As the bolt is tightened, the bolt tension and the bolt elongation increase as shown in FIG. 12 until the bolt installer is satisfied that the proper tension is achieved at point A. The numerals 1-4 in FIG. 12 correspond to states 1-4 illustrated in FIGS. 7-10. Subsequently, any decrease in bolt elongation will cause a reduction in bolt tension (from A to a minimum level). However, the bolt tension will be maintained at a minimum level 4 by the force applied by virtue of the resilient nature of the direct tension indicating washer 30.

Figure 13:
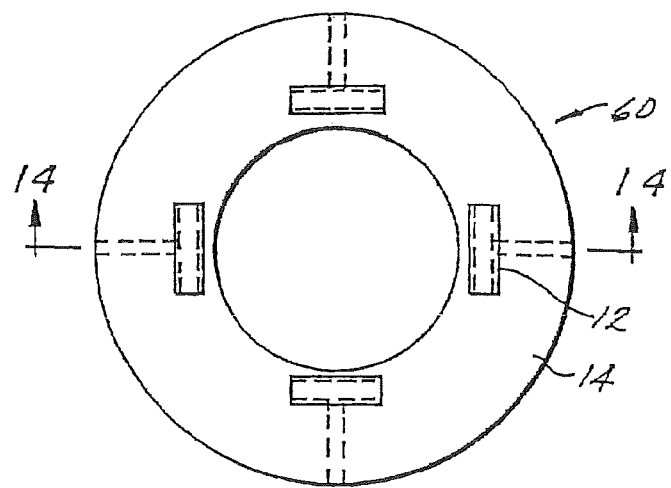
FIG. 13 is a top view of direct tension indicating washer in an alternative embodiment of the invention.
Figure 15:
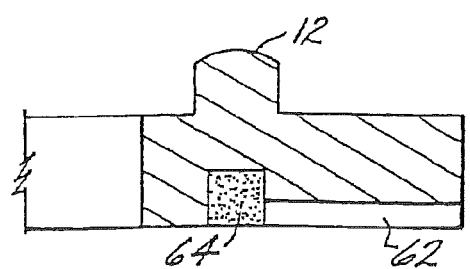
FIG. 15 is an enlarged view of a portion of the direct tension indicating washer of FIG. 14.

FIG. 13 is a top view of a direct tension indicating washer 60 in an alternative embodiment of the invention. The direct tension indicating washer 60 is similar to the direct tension indicating washer 10 shown in FIG. 1 in that protuberances 12 are formed on a first surface 14 and corresponding indentations 16 are formed on a second surface 18. The direct tension indicating washer 60 also includes channels 62 that lead from each indentation 16 to the outer diameter of the direct tension indicating washer 60. The indentation 16 is filled with an indicating material 64 as shown in detail in FIG. 15. The direct tension indicating washer 60 is manufactured in a process similar to the direct tension indicating washer 30. A tool and die are used to stamp the protuberances 12, indentations 16 and channels 62 into a blank washer. Other processes, such as metal machining or metal casting may be used to form the direct tension indicating washer 60. In some cases, the metal product will be heat treated by quenching and tempering after forming to produce the required spring-like load/deformation properties. In an exemplary embodiment, the direct tension indicating washer 60 is made from carbon steel, but stainless steel, nonferrous metals, and other alloy products may also be used. The indicating material 64 is an extrudable, elastomeric solid material such as colored silicone or other materials such a butadiene urethane.

Figure 16:
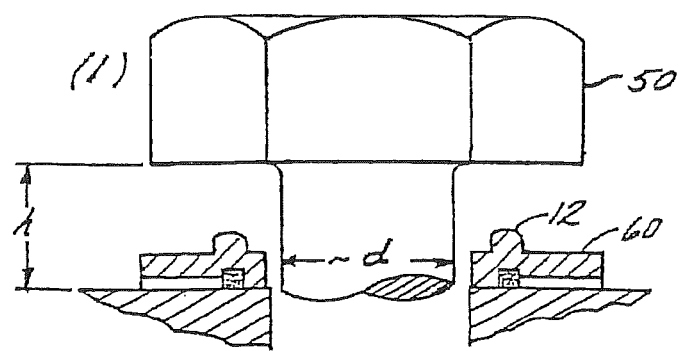
FIGS. 16-21 illustrate the state of the direct tension indicating washer of FIG. 13 during the installation process.
Figure 17:
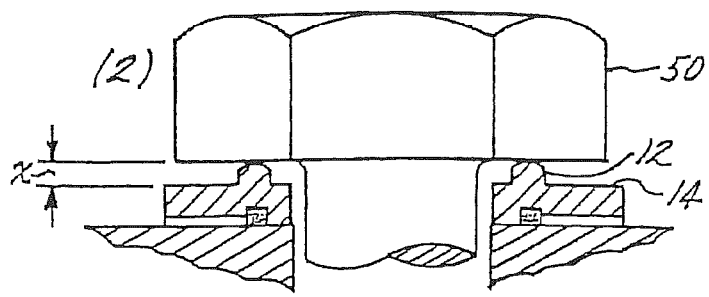
Figure 18:
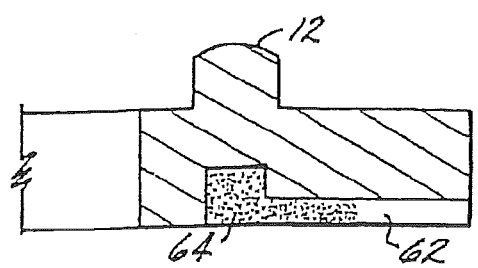

FIGS. 16-21 illustrate the state of the direct tension indicating washer 60 as a bolt 50 is tightened on the direct tension indicating washer 60. As shown in FIG. 16, the bolt is placed through an opening in the center of the direct tension indicating washer 60. This state is identified as stage 1 in FIG. 16. As the bolt 50 is tightened, the bottom of the bolt head contacts the protuberances 12 and begins to compress the protuberances towards the first surface 14 as shown in FIG. 17. FIG. 18 is an enlarged view of one of the indentations 16 illustrating that the force exerted by the protuberance 12 on the indicating material 64 forces the indicating material into channel 62. This state is identified in FIG. 17 as stage 2.

Figure 19:
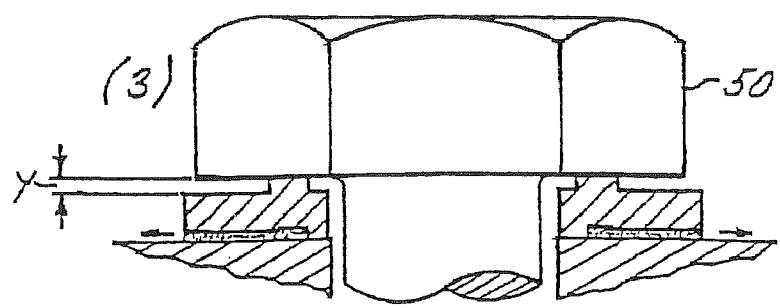
Figure 20:
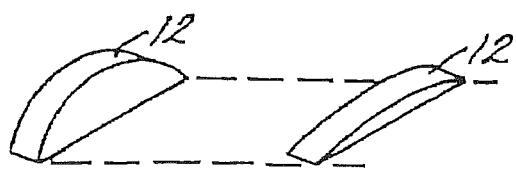
Figure 21:
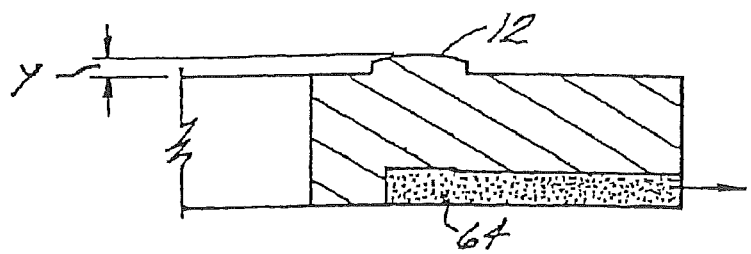

FIG. 19 illustrates the state of the direct tension indicating washer 60 when the bolt 50 has been tightened to a predetermined tension. When the desired bolt tension is achieved, the protuberances 12 have been compressed into the indentations 16 by a distance sufficient to force the indicating material 64 completely through the channel 62 so that the indicating material 64 appears at the outer diameter of the direct tension indicating washer 60. FIG. 20 shows the change in volume of the protuberances 12 from stage 1 to stage 3. The change in volume of the indentations 16 is calibrated to the volume of channel 62. FIG. 21 is an enlarged view of one of the protuberances 12 and the channel 62 when the predetermined bolt tension has been achieved. As shown in FIG. 21, the indicating material 64 has been forced through the channel 62 and exits the channel at the outer diameter of the direct tension indicating washer 60.

Figure 14:
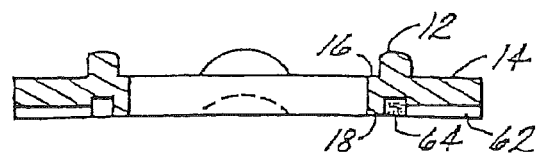
FIG. 14 is a cross-sectional view taken along line 14-14 of FIG. 13.
Figure 22:
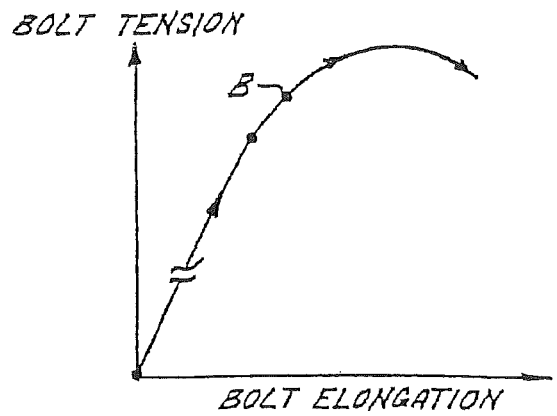
FIG. 22 is a graph of bolt tension versus bolt elongation when using the conventional direct tension indicating washer shown in FIGS. 1-2.
Figure 23:
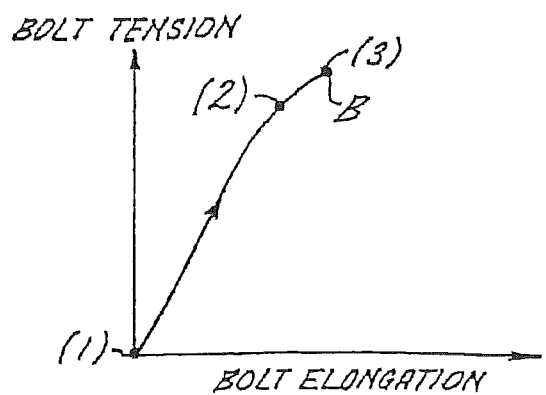
FIG. 23 is a graph bolt tension versus bolt elongation when using the direct tension indicating washer shown in FIG. 13.

FIG. 22 is a graph of bolt tension versus bolt elongation when using a convention direct tension indicating washer such as that shown in FIG. 1. The desired bolt tension is shown at point B. The bolt installer, however, has no indication that the desired bolt tension has been reached and continues to tighten the bolt past the desired bolt tension B. FIG. 23 is a graph of bolt tension versus bolt elongation when using the direct tension indicating washer 60 shown in FIGS. 13-14. The numerals 1-3 on the graph of FIG. 23 correspond to stages 1-3 shown in FIGS. 16-21. When the desired bolt tension is achieved at point B, the indicating material 64 will appear at the outer diameter of the direct tension indicating washer 60 and the bolt installer knows to discontinue tightening of the bolt. If the extruded indicating material has worn away over time, and confirmation of bolt tension is needed, a feeler gage may be used to confirm adequate bolt tension as shown in FIG. 1A.

Figure 24:
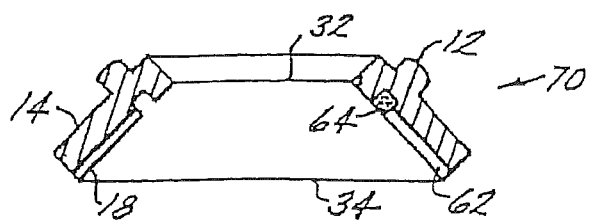
FIG. 24 is a cross-sectional view of a direct tension indicating and maintaining washer in yet another embodiment of the invention.

FIG. 24 is a cross sectional view of another embodiment of the invention. The direct tension indicating washer 70 in FIG. 24 combines the features of direct tension indicating washer 30 and direct tension indicating washer 60 described above. Accordingly, the direct tension indicating washer 70 both maintains tension by using a conical washer body but also includes the channel 62 and indicating material 64 for immediate detection of the proper bolt tension. The inner diameter edge 32 lies in a plane different than the plane of the outer diameter edge 34.

FIGS. 25A-25E illustrates emission of the indicating material with increased bolt tension. As shown in FIG. 25, as bolt tension, P, increases from zero to Ps, the intended calibration tension, the indicating material exits the channel. In FIG. 25A, the indicating material is silicone, which typically cures in the indentation prior to use. When cured, although flexible, the silicone is not compressible. Consequently, as the volume of the indentations becomes smaller as the protuberance is compressed, the silicone begins appearing on the outside at around 70% of the intended bolt pretension, shown as P=0.7 Ps in FIG. 25C. This sometimes confuses bolt installers, and they stop tightening at that point. To simply fill the depression with less silicone, does result in a later (higher bolt preload) appearance of silicone, however this practice is risky because of inherent variables in the metal strength the bolt pretension sometimes climbs too high before the silicone is clearly visible. Additional silicone exits the channel as the bolt tension reaches the desired level as shown in FIGS. 25D and 25E.

Accordingly, in alternate embodiments of the invention, a different indicating material is used in the indentations. FIGS. 26A-26E illustrate emission of indicating material with increased bolt tension in an alternate embodiment. In the embodiment of FIG. 26, the indicating material has compressibility and modified polymerization to control the release of indicating material through the channel.

The indicating material in FIGS. 26A-26E is made more compressible than typical silicone. The compressibility is achieved by formulating and then energetically mixing the silicone under an inert blanket of nitrogen in such a way as to deposit micro bubbles of nitrogen into the silicone. In lieu of nitrogen, ultra-dry air may be used. These micro-bubbles have the property of being compressible within the liquid silicone, while not affecting the curing properties of the silicone.

Modified polymerization generates a cured skin over the compressible silicone in the indentation. Most moisture/heat cured silicones have the property of curing from the outside surface inward without stopping, thereby resulting, after a complete cure, in uniform properties all the way through the cured and solid elastomeric silicone. Embodiments of the invention use silicone with an additive material mixed into the liquid silicone which has, when triggered by heat or infrared radiation, the effect of terminating the polymerization process. This process results in the polymerization of about 1 millimeter of thickness, leaving the remaining silicone core encapsulated in liquid form, ready to compress and then explode out in liquid form.

In one embodiment, the silicone is cured by the addition of a platinum based catalyst containing an amine or sulphur based molecular sieve which has the capability of poisoning the curing reaction when activated by heat. After the liquid silicone is deposited into the metal DTI, a short interval of time will allow the surface curing to begin, and then an application of heat will terminate the curing process, leaving the liquid compressible core.

In an alternate embodiment, the compressible silicone is deposited in the indentation. The compressible silicone is then capped right away with a second fast curing skin which can be any of a large number of materials, sprayed of otherwise deposited on top of the compressible silicone underneath. The indentation is then flash cured by heat or Ultraviolet Light (UV) so that the compressible silicone underneath stops curing.

When this combination of skinned over and liquid core of compressible silicone is used, the onset of silicone appearance at the periphery of the DTI is delayed as shown in FIGS. 26A-26E. As shown in FIGS. 26A-26D, as the bolt tension increases from 0 to 0.9 Ps, the silicone indicating material is not emitted through the channel right to the end. This is due to the compressibility of the silicone and the cured skin on the outside of the indicating material. At a particular bolt pretension about 90-95% of the intended bolt calibration load, the silicone appearance on the outside is climactic and dramatic as shown in FIG. 26E, effectively alerting the installer that the correct bolt pretension has been achieved.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method of making a direct tension indicating washer comprising:
    forming a first surface having a discrete protuberance formed thereon;
    forming a second surface having a discrete indentation formed opposite the protuberance;
    positioning an indicating material in the indentation; and
    curing an external portion of the indicating material to form a cured skin of indicating material on an outside of the indicating material and a liquid core in an interior of the indicating material.

2. The method of claim 1 wherein the indicating material is mixed under nitrogen prior to being polymerized.

3. The method of claim 1 wherein the indicating material is mixed under ultra-dry air prior to being polymerized.

4. The method of claim 1 wherein the cured skin is formed by initiating polymerization of the indicating material and terminating the polymerization upon formation of the cured skin.

5. The method of claim 4 wherein polymerization is terminated by applying energy to the indicating material.

6. The method of claim 5 wherein the indicating material includes a catalyst for terminating the polymerization when activated by heat.

7. The method of claim 1 further comprising forming a channel leading from the indentation to an outer diameter of the direct tension indicating washer.

8. The method of claim 1 further comprising:
    forming a plurality of discrete protuberances on the first surface;
    forming a plurality of discrete indentations on the second surface has, each indentation formed opposite one of the protuberances; and
    forming a plurality of channels in the second surface, each channel leading from one of the indentations to an outer diameter of the direct tension indicating washer.

9. The method of claim 6 wherein the catalyst is a platinum based catalyst.

* * * * *